United States Patent
Kim

(10) Patent No.: US 7,441,633 B2
(45) Date of Patent: Oct. 28, 2008

(54) APPARATUS FOR AUTOMATIC BRAKE OF WALKING SUPPORT MACHINE

(76) Inventor: Duk Young Kim, 2-302, Sinpovilla, 118, Hwanggeum-Dong, Suseong-Gu, Daegu, 706-040 (KR)

( * ) Notice: Subject to any disclaimer, the term of this patent is extended or adjusted under 35 U.S.C. 154(b) by 0 days.

(21) Appl. No.: 11/986,387

(22) Filed: Nov. 21, 2007

(65) Prior Publication Data

US 2008/0142315 A1    Jun. 19, 2008

(30) Foreign Application Priority Data

Dec. 15, 2006    (KR)    ............ 10-2006-0128485

(51) Int. Cl.
*B62M 1/14*    (2006.01)
(52) U.S. Cl. ............... 188/78; 280/250.1; 188/2 F
(58) Field of Classification Search ............ 188/2 F, 188/74, 78; 280/246, 250.1, 252; 180/65.5, 180/65.6
See application file for complete search history.

(56) References Cited

U.S. PATENT DOCUMENTS

| | | | | |
|---|---|---|---|---|
| 5,366,037 A * | 11/1994 | Richey | ............. | 180/65.5 |
| 5,878,829 A * | 3/1999 | Kanno et al. | ............. | 180/65.5 |
| 6,015,021 A * | 1/2000 | Tanaka et al. | ............. | 180/206 |
| 6,017,046 A * | 1/2000 | Markovic | ............. | 280/250.1 |
| 6,755,430 B1 * | 6/2004 | Watwood et al. | ............. | 280/250.1 |
| 6,805,371 B2 * | 10/2004 | Meginniss et al. | ............. | 280/250.1 |
| 7,001,313 B1 | 2/2006 | Crnkovich | | |
| 2003/0018417 A1 * | 1/2003 | Ulrich et al. | ............. | 701/1 |
| 2003/0057673 A1 * | 3/2003 | Fowles | ............. | 280/252 |
| 2007/0164528 A1 | 7/2007 | Morath | | |

* cited by examiner

*Primary Examiner*—Christopher P Schwartz
(74) *Attorney, Agent, or Firm*—Blakely, Sokoloff, Taylor & Zafman LLP

(57) ABSTRACT

The present invention relates to an apparatus for automatic brake of walking support machine which is safe on downward slopes by preventing over speed due to the acceleration of gravity and protect user on upward slopes.

The present invention is devised for walking support machines consist of steering handles (1), main body (2), and a front wheel (3) and 3 rear wheels (4), and is characterized by being comprised of; fixed disks (10) which are installed at the bottom of said main body (2) and support rear wheels (4) to enable rotation; high speed gears (20) and low speed gears (30) which are installed in said rear wheels (4) concentrically; brake drums (40) which are installed on the outside of said fixed disks (10); $1^{st}$ gears (50) installed on the center shaft of said brake drums (40); $2^{nd}$ gears (60) which are installed on one side of said brake drums (40) with unidirectional clutches (C) to prevent backward running and assembled with said $1^{st}$ gear; adjusting knobs (70) which are installed inside of said fixed disks (10), rotatable, and assembles $1^{st}$ gears (50) and $2^{nd}$ gears (60) selectively with high speed gears (20) and low speed gears (30); and two pairs of brake disks (80) installed inside said brake drums (40) to receive spring (S1) tension and rotate in connection with said $1^{st}$ gears (50); in said two rear wheels.

3 Claims, 12 Drawing Sheets

APPARATUS FOR AUTOMATIC BRAKE OF WALKING SUPPORT MACHINE

DETAIL DESCRIPTION OF THE INVENTION

Object of the Invention

This invention relates to a walking support machine used by those who have difficulties in walking, in more particular, an automatic brake apparatus for walking support machine which is safe on downward slope by preventing over speed due to the acceleration of gravity and protect user on upward slope.

In general, walking support machines are used as walking aids for those who have difficulties in walking by enabling them to walk or move to other places.

Though conventional walking support machines are available in various configurations, basically, they are consisted of a steering handle held by hands to push or pull, main body of which frame is made with cut and bent steel pipe and connected with the bottom of said steering handle, and front and rear wheels formed on the bottom of said main body.

The conventional walking support machines are installed with levers on said steering handles, which are connected with brake apparatuses which can brake said rear wheels to enable users to brake the machine with said levers on the steering handles.

However, though conventional walking support machines have no problem on level ground, but on downward slopes, if an unexpected situation occurs, such as user's eight is added to the machine in addition to the acceleration of gravity and the machine is rapidly accelerated, accident may occur because it is not easy for the handicapped to brake the machine with brake levers on steering handles.

In addition, because conventional walking support machines are not equipped with any device which can prevent backward movement, the machine may run backward on an upward slope ending accident. Therefore, user safety on upward slopes is not guaranteed.

On the other hand, since the users of walking support machines are patients, the aged, or handicapped persons who have difficulties in walking, it is desirable for walking support machines to help make users stronger, in addition to walk aid. However, conventional walk support machines are only for walk aid and not of any help for physical exercise.

Technical Object of the Invention

The purpose of the present invention is to improve above mentioned problems of conventional walk support machines. In more particular, this invention provides an automatic brake apparatus for walk support machines, which is activated automatically in low or high speed according to the physical capability of user, to prevent accidents caused by excessive acceleration on downward slopes and by backward rolling on upward slopes.

In addition, the present invention can provide exercising effect to help make muscles stronger of users by controlling moving speed to suit for user condition.

To this end, the present invention provides an automatic brake apparatus for walking support machines which is characterized by being comprised of; fixed disks which are installed at the bottom of main body and support rear wheels to enable rotation; high speed gears and low speed gears which are installed in the rear wheels concentrically; brake drums which are installed on the outside of the fixed disks: $1^{st}$ gears installed on the center shaft of said brake drums; $2^{nd}$ gears which are installed on one side of said brake drums with unidirectional clutches to prevent backward running and assembled with said $1^{st}$ gear; adjusting knobs which are installed inside of said fixed disks, rotatable, and assembles $1^{st}$ gears and $2^{nd}$ gears selectively with high speed gears and low speed gears; and two pairs of brake disks installed inside said brake drums to receive spring tension and rotate in connection with said $1^{st}$ gears; in said two rear wheels, so that if the machine speed exceeds a certain level on a downward slope, the two pairs of brake disks contact on the inner wall of the brake drum by centrifugal force to exert braking force.

CONSTITUTION AND FUNCTION OF THE INVENTION

Figure 1:
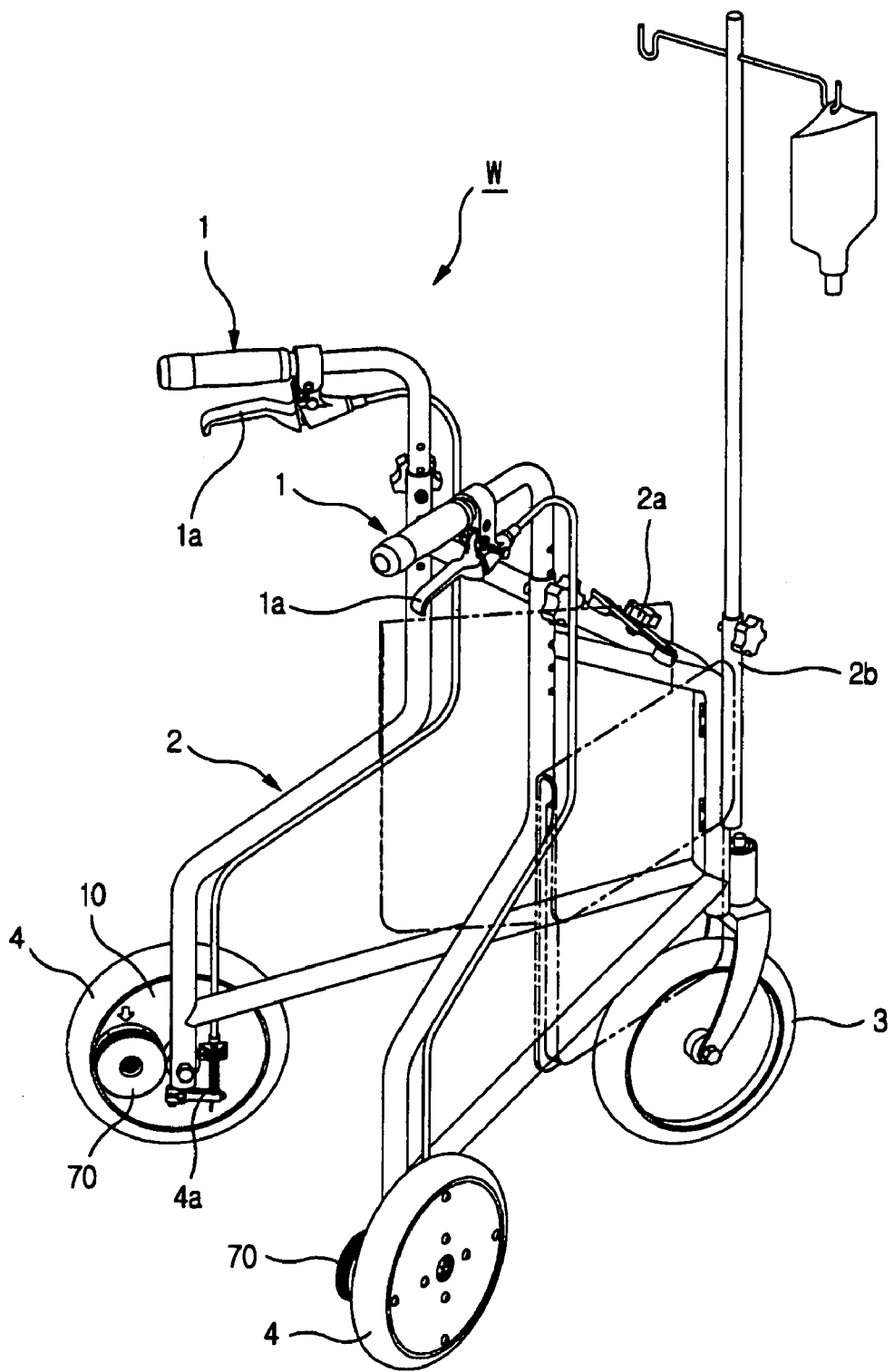
FIG. 1 is a perspective view of a walking support machine equipped with an embodiment of the apparatus in accordance with the present invention.

The functions and their effects of the said members set forth and described herein above are described herein below with reference to the attached drawings.

The automatic brake apparatus in accordance with the present invention, as shown in FIG. 1 to FIG. 9b, is characterized by being comprised of; for a walking support machine (W) having steering handles (1), main body (2), and front and rear wheels (3) (4); fixed disks (10) which are installed at the bottom of main body and support rear wheels (4) to enable rotation; high speed gears (20) and low speed gears (30) which are installed in the rear wheels concentrically; brake drums (40) which are installed on the outside of the fixed disks (10): $1^{st}$ gears (50) installed on the center shaft of said brake drums (40); $2^{nd}$ gears (60) which are installed on one side of said brake drums (40) with unidirectional clutches (C) to prevent backward running and assembled with said $1^{st}$ gear (50); adjusting knobs (70) which are installed inside of said fixed disks (10), rotatable, and assembles $1^{st}$ gears (50) and $2^{nd}$ gears (60) selectively with high speed gears (20) and low speed gears (30); and two pairs of brake disks (80) installed inside said brake drums (40) to receive spring (S1) tension and rotate in connection with said $1^{st}$ gears (50).

Here, said walking support machine (W), as shown in FIG. 1, comprises steering handles (1) held by user's hands and enables brake control, main body (2) which is the skeleton of the machine (W), and a front wheel (3) and rear wheels (4) installed on bottom of the machine (W) for travel.

Brake levers (1a) are installed on the said steering handles (1), as shown in FIG. 1, which are used to brake the rear wheels (4) as necessary.

The main body (2) of said walking support machine (W) is formed with, as shown in FIG. 1, a hinge member (2a) to enable the main body (2) to be folded for storage and a Ringer solution bottle hanging pole (2b). The main body (2) may be provided with a chair for sit on to rest, or a bag to keep user's belongings.

As shown FIG. 1, said front wheel (3) is installed at bottom front of said main body (2) and said rear wheels (4) are installed by two (2) at both sides of the rear of said main body (2). Said rear wheels (4) are installed with brake member (4a) which is connected with the brake levers (1a) of the steering handles (1).

Figure 3:
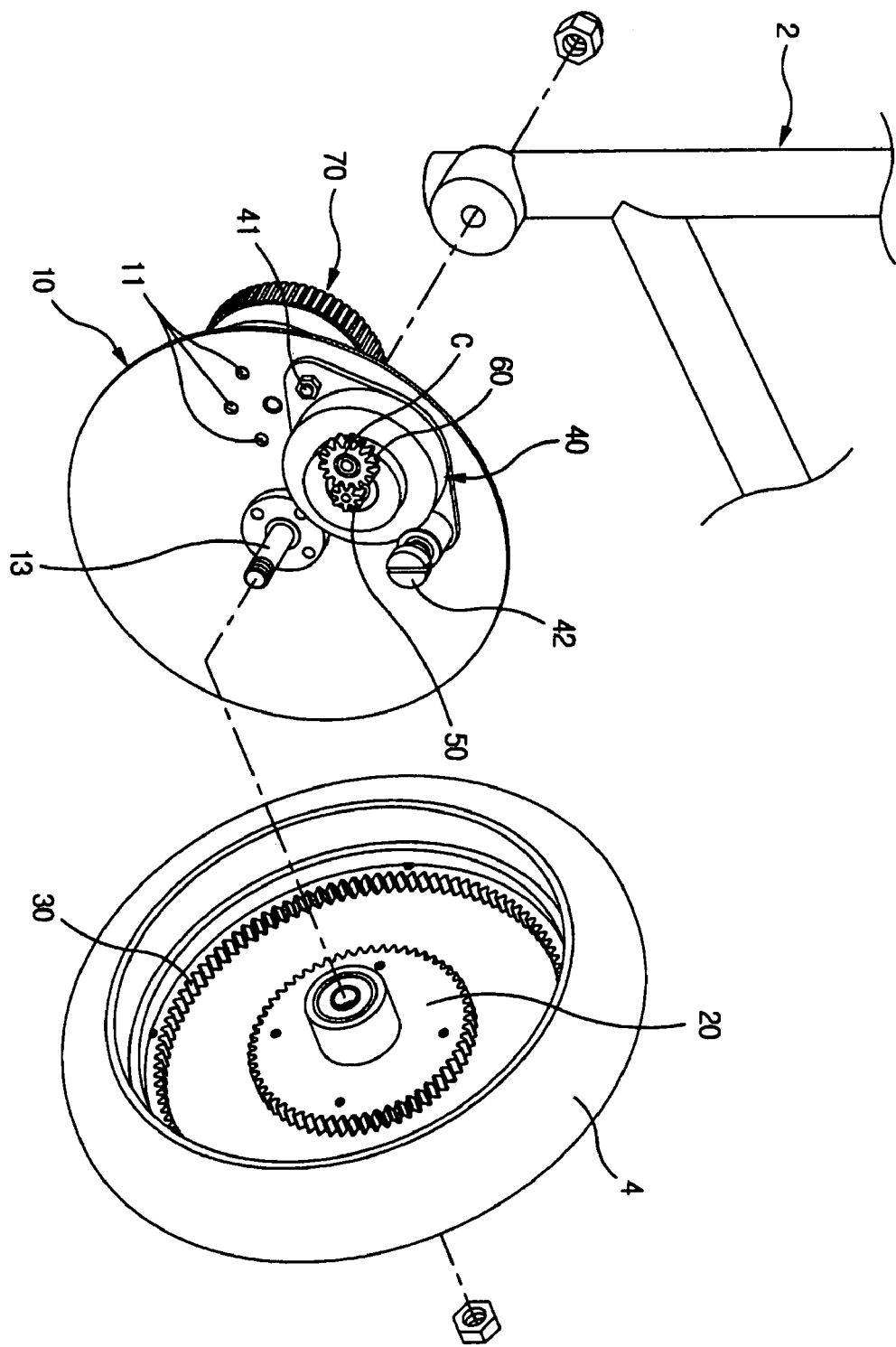
FIG. 3 is a perspective of view of an embodiment of the present invention.
Figure 4:
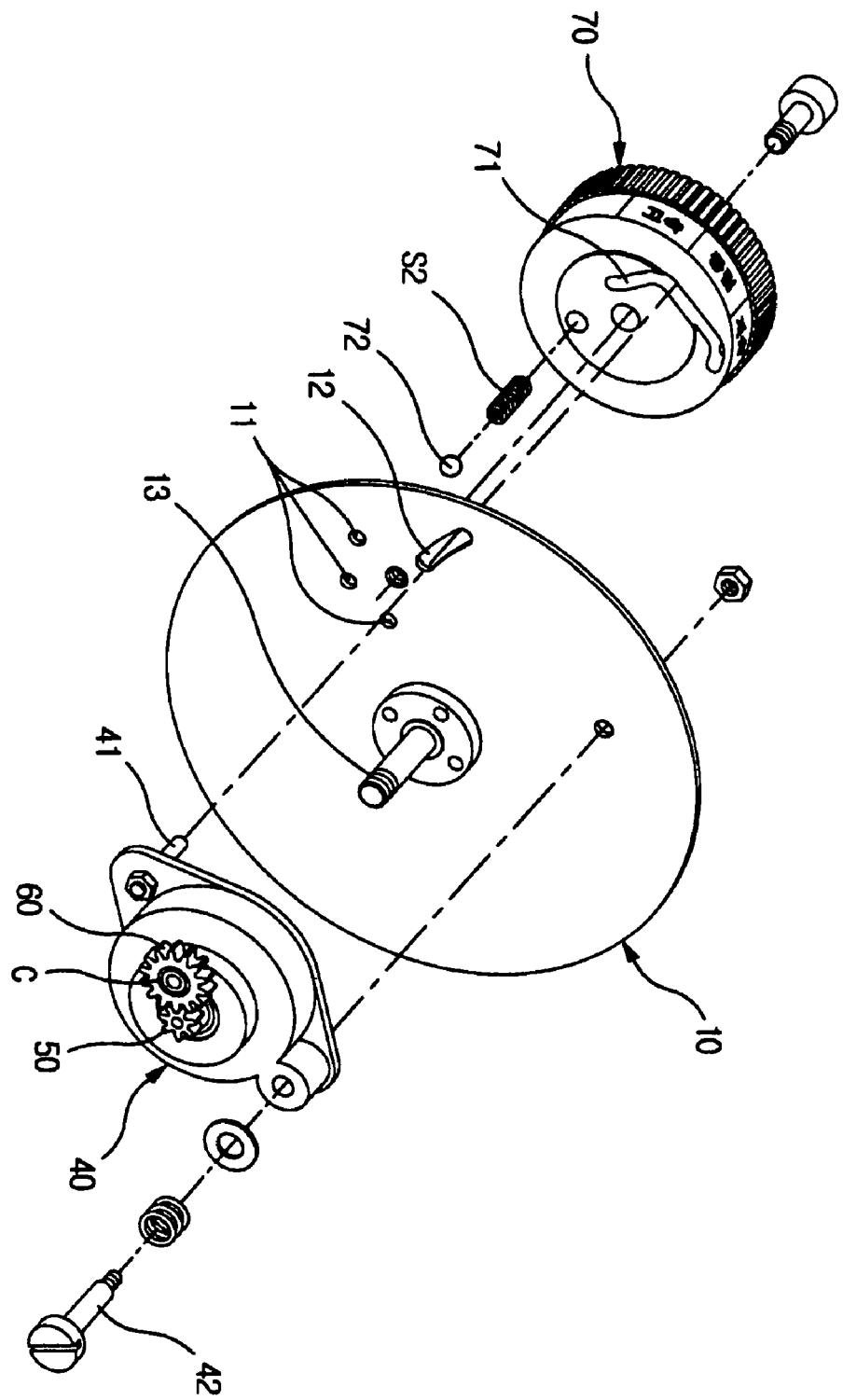
FIG. 4 is an exploded perspective view of the major parts of the present invention

The said fixed disks (10) are installed at bottom of the main body (2) on both sides to support rear wheels (4) so that the wheels can rotate. On one side of a fixed disk (10), as shown in FIGS. 3 and 4, three engagement holes (11) which engages high speed (H), middle speed (M), and low speed (L) respectively are formed at certain intervals, and on one side of the fixed disk (10) is formed with a long guide hole (12) which guides the brake drum (40). On center outside of said fixed disk (10) is installed with a shaft (13) which enables rotation of rear wheel (4), and said rear wheel (4) covers the fixed disk (10) while inserted with the shaft (13), therefore, high speed gear (20), low speed gear (30), brake drum (40), $1^{st}$ gear (50), and $2^{nd}$ gear (60) are not exposed to outside.

Figure 5:
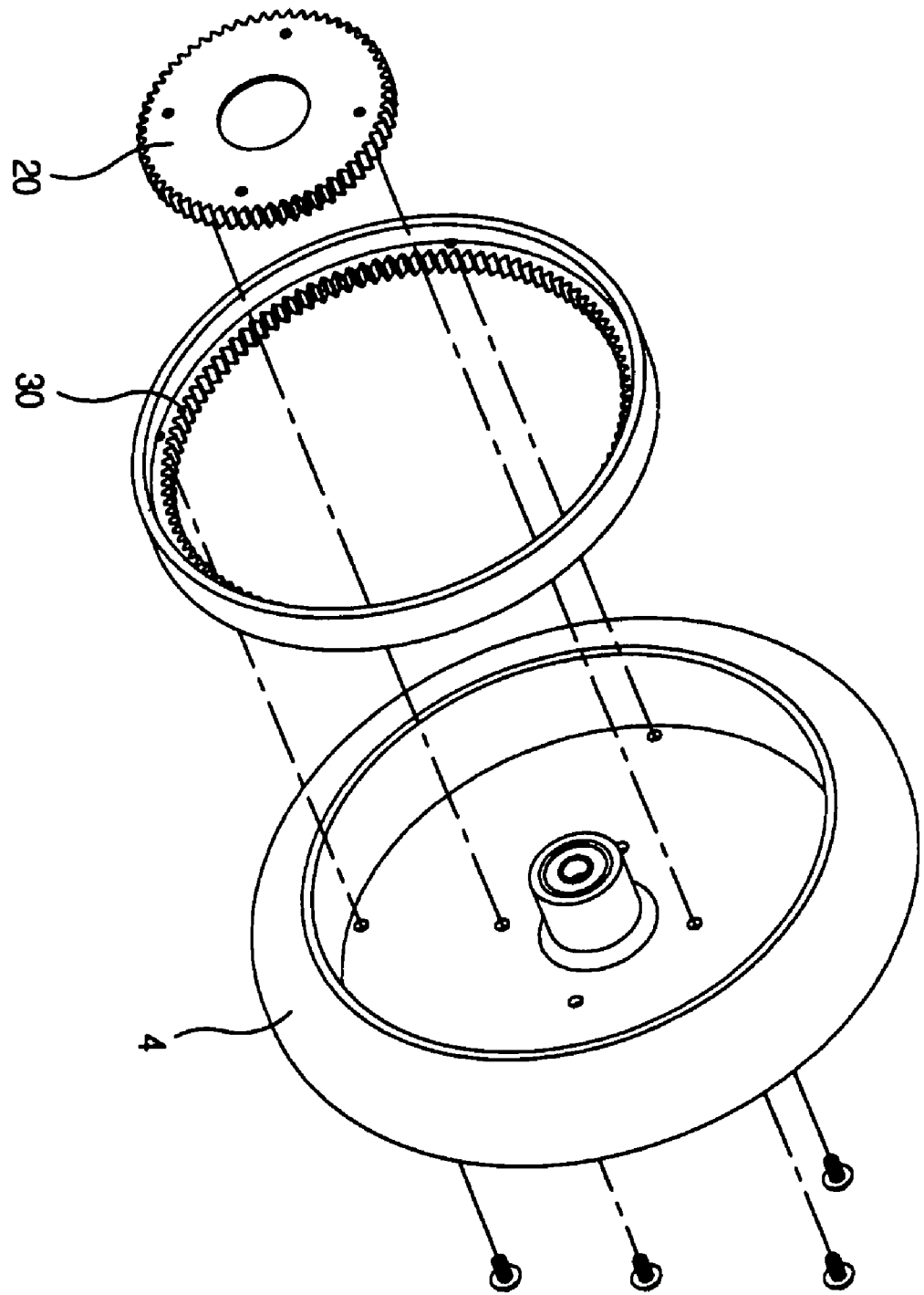
FIG. 5 is an exploded perspective view of the high speed gear and low speed gear in accordance with the present invention.

As shown in FIGS. 3 and 5, said high speed gear (20) and low speed gear (30) are installed at the center and edge of the rear wheel (4) inside concentrically, and the high speed gear (20) increases rotational speed of the $1^{st}$ gear (50) selectively, and the low speed gear (30) increases speed of the $2^{nd}$ gear (60) selectively. As shown in the figures, said high speed gear (20) and low speed gear (30) have larger diameter than those of the internal ($1^{st}$) and $2^{nd}$ gear (50) (60), and the larger the diameters, the faster the speed of internal ($1^{st}$) and $2^{nd}$ gear (50) (60) become.

The brake drum (40), as shown in FIGS. 3 and 4, is installed on the outside of and engaged with the fixed disk (10), and formed with a guide rod (41) which is inserted into the long guide hole (21) of the fixed disk (10). One end of said brake drum (40), as shown in the FIGS. 3 and 4, is connected with a shaft (42) with fixed disk (10) to receive force from spring and rotatable, and the other end is assembled with the guide rod (41) which is inserted into the long guide hole (12).

Figure 8:
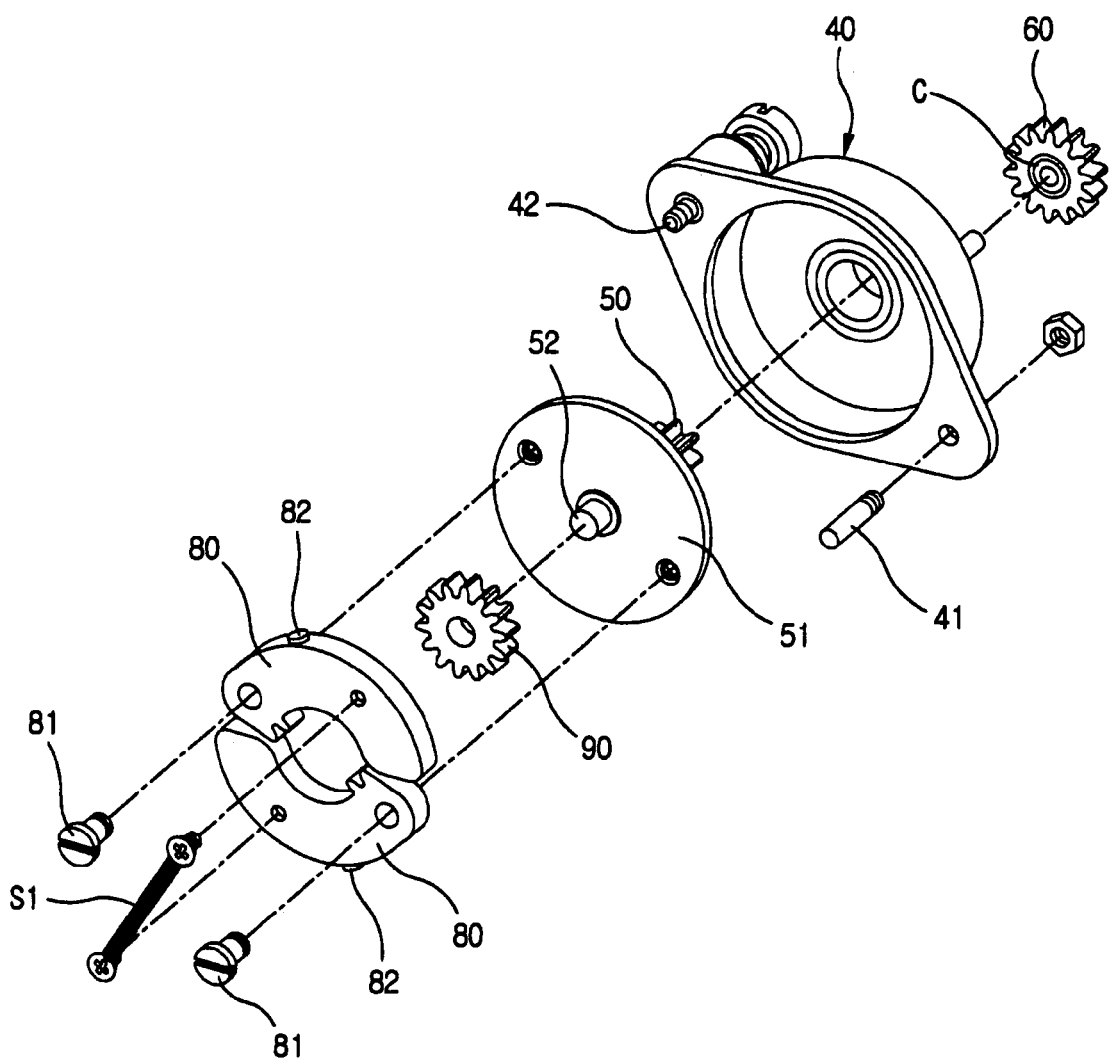
FIG. 8 is an exploded view of FIG. 7.

The said $1^{st}$ gear (50) shown in FIGS. 3, 4, and 8 is installed on the center of the brake drum (40) by a shaft, rotatable, and is engaged selectively with high speed gear (20) to increase the speed of brake disk (80). The $1^{st}$ gear (50) is assembled with a rotating disk (51) which is installed in the brake drum (40), as shown in FIG. 8, and supports a pair of brake disks (80), and a supporting shaft (52) which supports idle gear (90), which will be described later, is assembled at the center of said rotating disk (51).

Said $2^{nd}$ gear (60), shown in FIGS. 3, 4, and 8, is installed on one side of the brake drum (40) with a unidirectional clutch© to prevent backward rotation and engages with the $1^{st}$ gear (50), and the $2^{nd}$ gear (60) is selectively engaged with the low speed gear (30) to increase the rotating speed of the brake disk (80).

Said unidirectional clutch (C) allows rotation of the $2^{nd}$ gear (60) only in the direction in which the rear wheel (4) proceeds forward. Therefore, because reverse rotation of the $2^{nd}$ gear (60) is prevented by the unidirectional clutch (C), rear wheel (4) cannot move backward when the internal and $2^{nd}$ gears (50) (60) are engaged with the high speed and low speed gears (20) (30) selectively.

Said adjusting knob (70), which is installed inside the fixed disk (10), to be rotatable, engages the internal and $2^{nd}$ gears (50) (60) selectively with the high speed gear (20) and low speed gear (30), is formed with a cam hole (71), shown in FIG. 4, which guides the guide rod (41) of the brake drum (40) to high, middle and low speed positions, and installed with an engagement ball (72) which engages with the 3 engagement holes (11) which engages high, middle and low speed, with spring force. The center of the adjusting knob (70) is assembled with the fixed disk (10) by bolt joint to allow rotation.

Figure 2A:
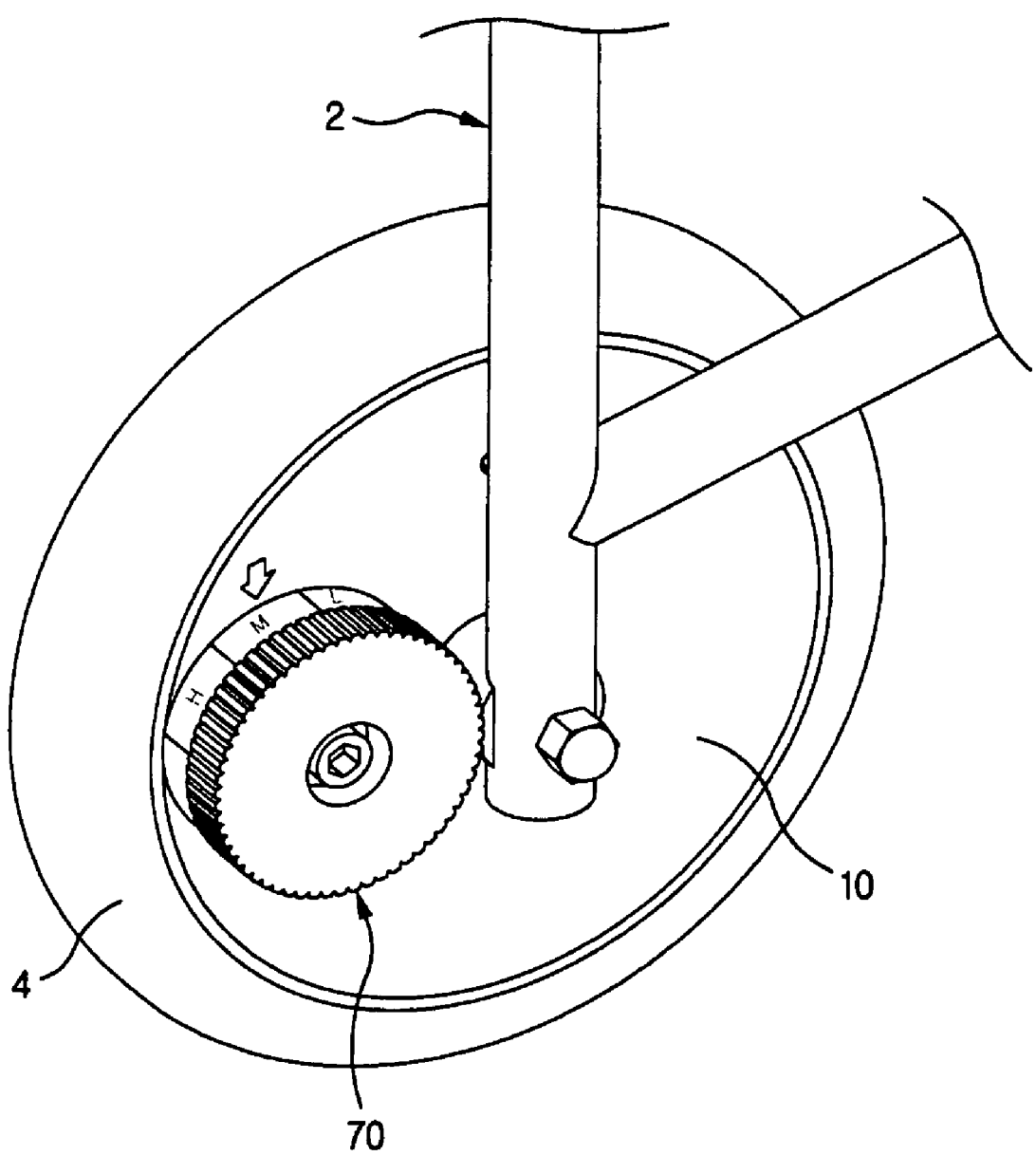
FIGS. 2a and 2b are perspective views of the rear wheel installed with the apparatus implemented in accordance with the present invention.
Figure 2B:
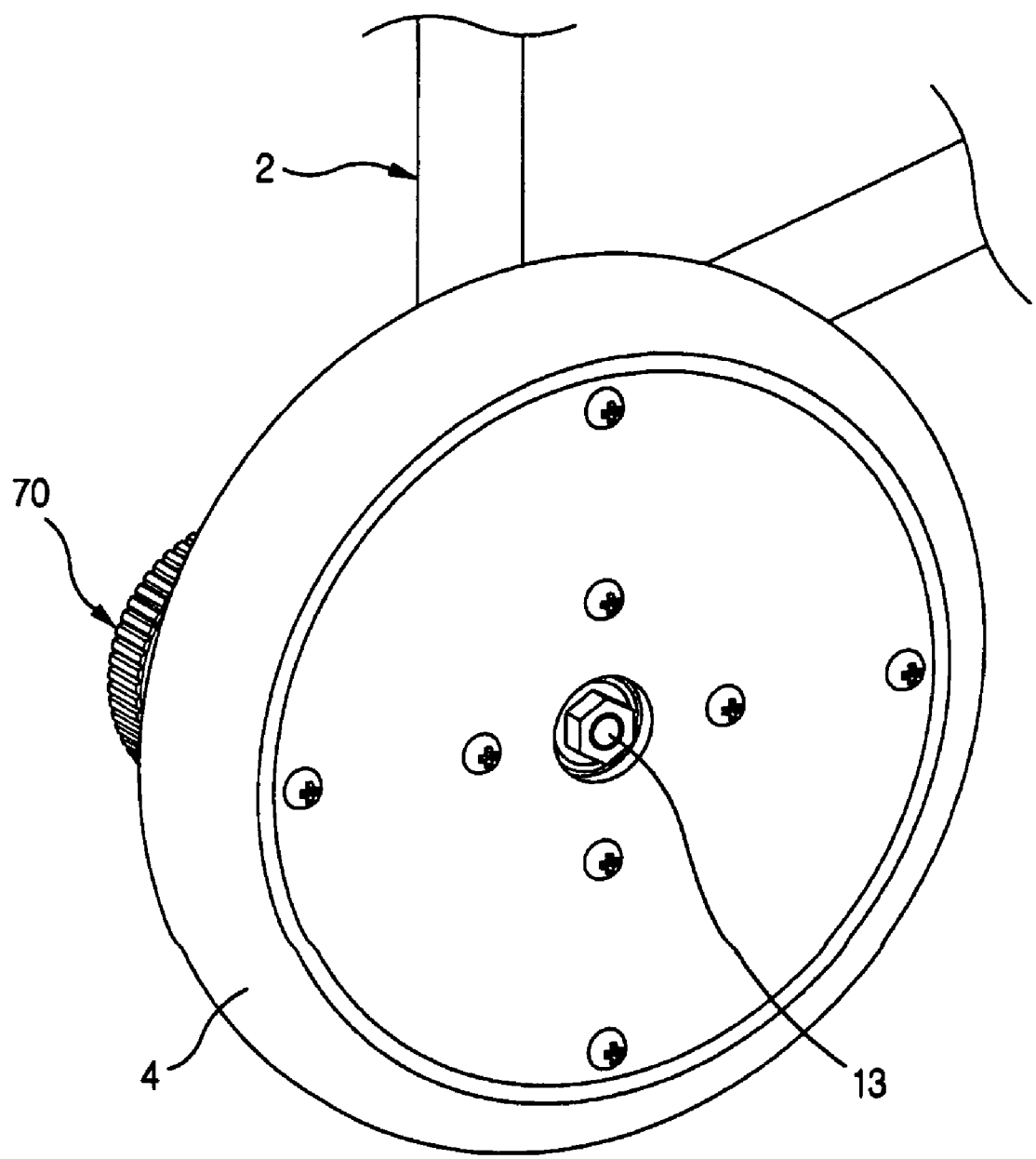

The adjusting knob (70) shown in FIG. 2a is formed in spherical shape, marked with signs indicating high, middle, and low speeds on outer surface, and on appropriate points of inside the fixed disk (10) are marked with an arrow to point one of the high, middle, and low speed positions of the adjusting knob (70).

Figure 6A:
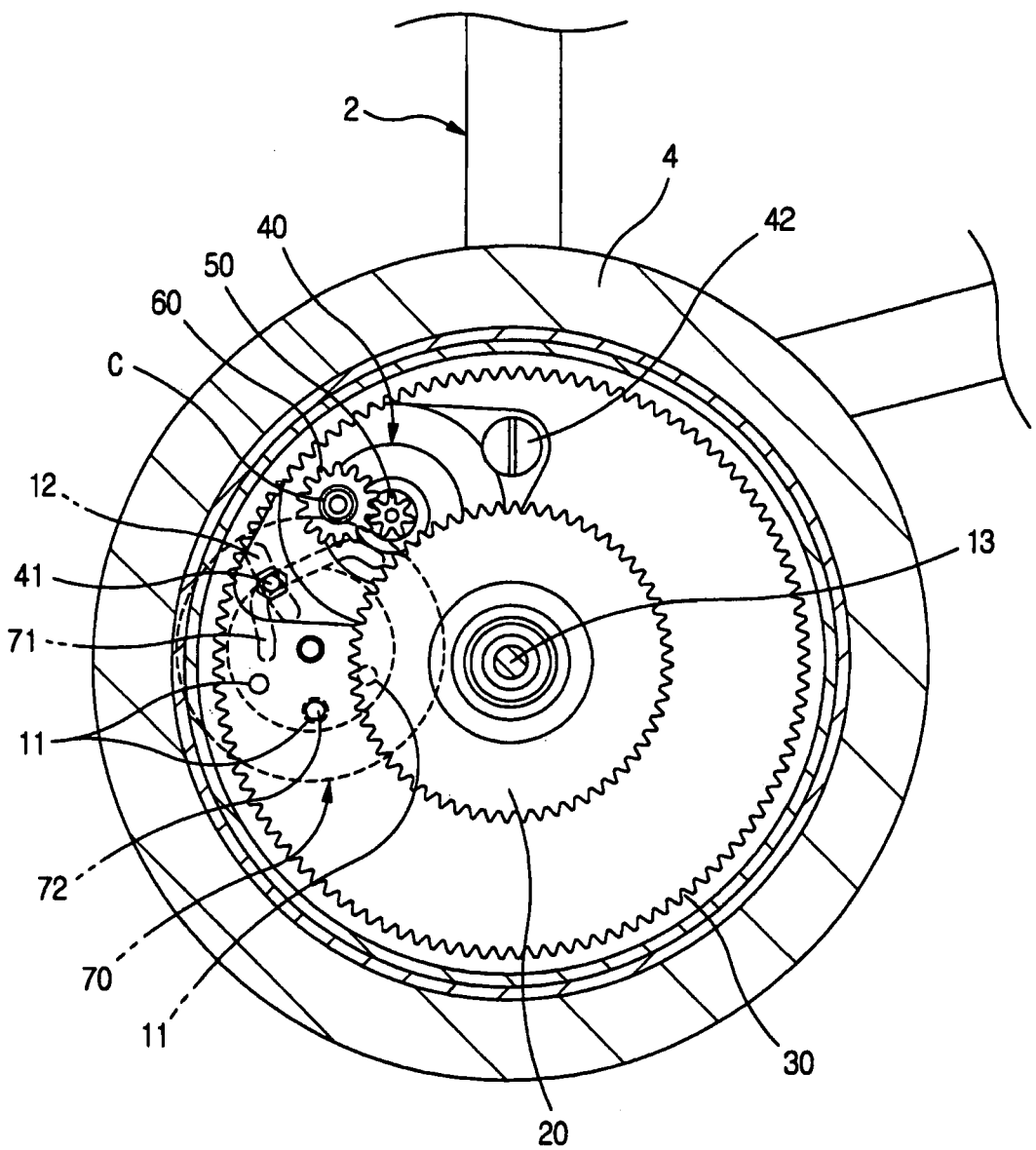
FIGS. 6a, 6b, and 6c are cross-sectional views of the internal and $2^{nd}$ gears in accordance with the present invention.
Figure 6B:
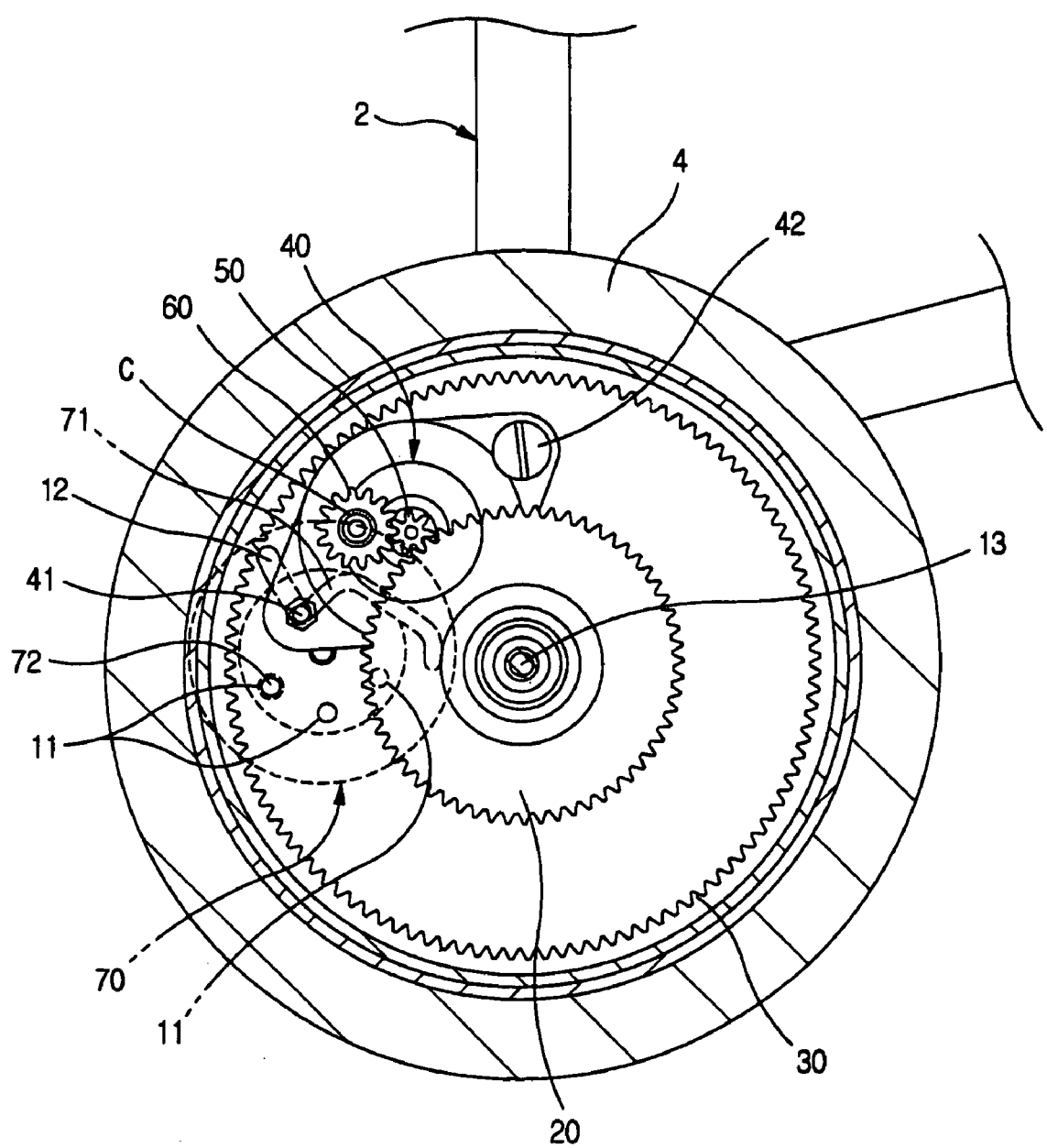
Figure 6C:
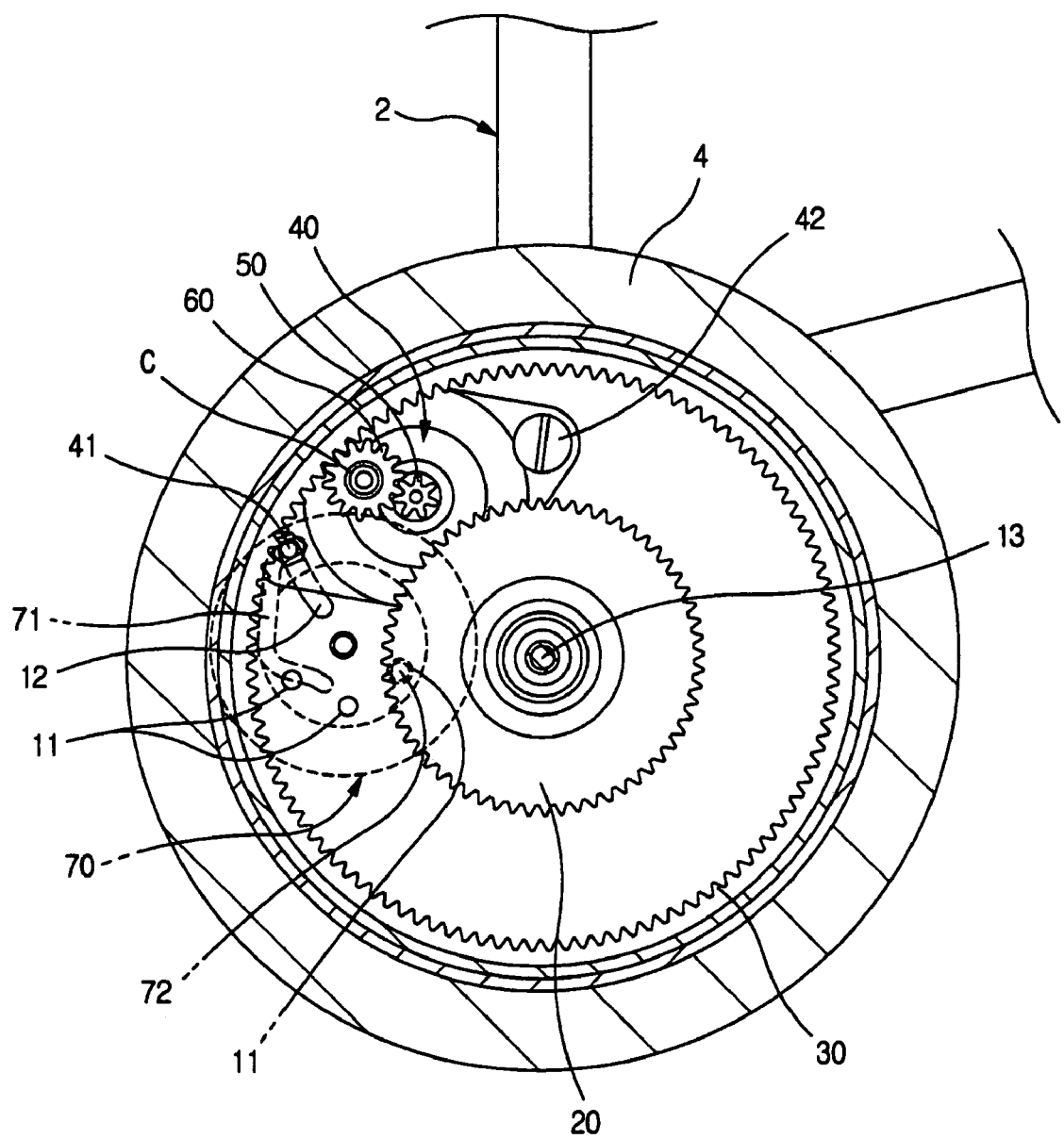
Figure 7:
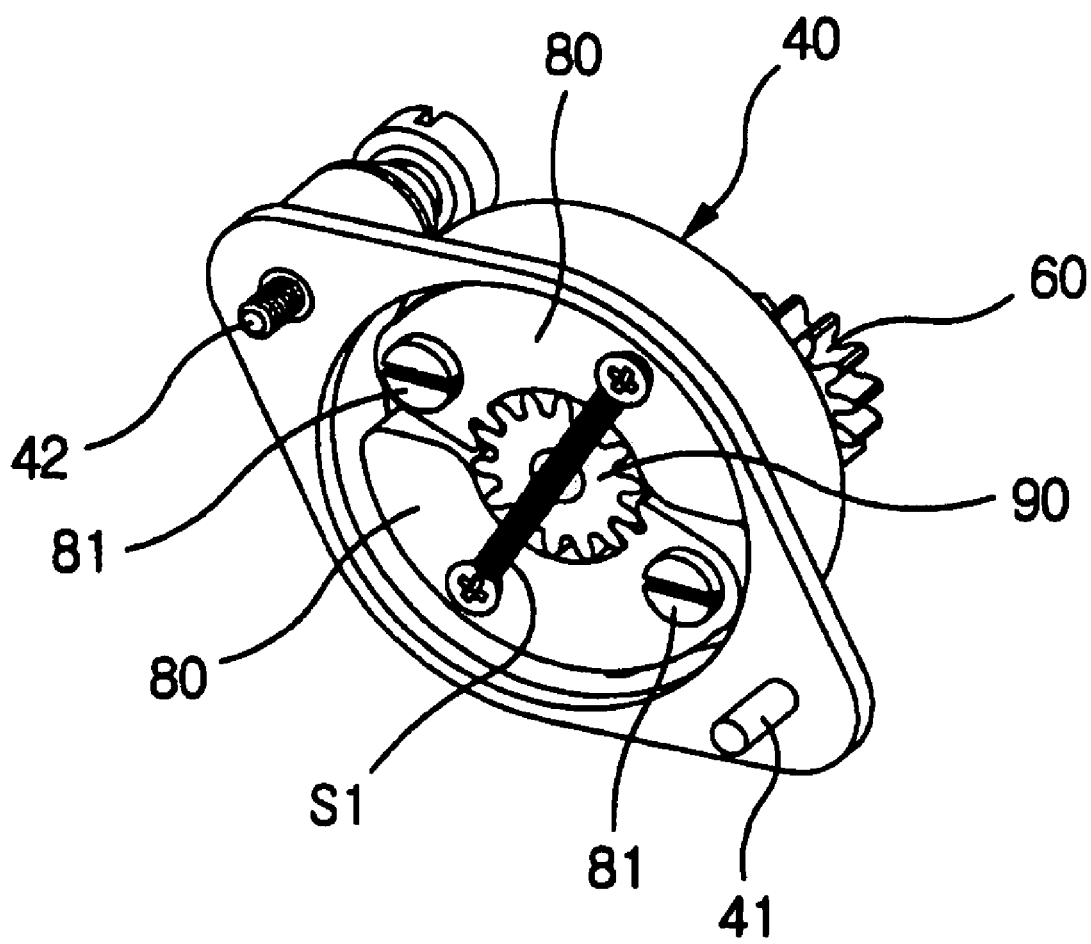
FIG. 7 is a perspective view of brake drum assembly in accordance with the present invention.

If the adjusting knob (70) is rotated to match high speed mark with the arrow sign on the fixed disk (10), as shown in FIG. 6b, the $1^{st}$ gear (50) is engaged with the high speed gear (20), and the engagement ball (72) is engaged with the respective engagement hole (11) with a click sound. If the adjusting knob (70) is rotated to match the neutral mark with the arrow on the fixed disk (10), the internal and $2^{nd}$ gears (50) (60) are deviated from high and low speed gears (20) (30), as shown in FIG. 6a, and if the adjusting knob (70) is rotated to match low speed mark with the arrow on the fixed disk (10), the $2^{nd}$ gear (60) is engaged with the low speed gear (30), as shown in FIG. 6c.

Said one pair of brake disks (80), shown in FIGS. 7, 8, 9a and 9b, are installed in the brake drum (40) to receive force from spring (S1) and rotates with the $1^{st}$ gear (50) as a single body, and is formed in half-circle shape of which one end is jointed with bolt (81) to the rotating disk (51) of the $1^{st}$ gear (50) to be able to rotate, eccentrically, and outer surface is attached with brake pad (82) which is made with high frictional material and isolated from the inside of the brake drum (40) by a small gap.

Figure 9A:
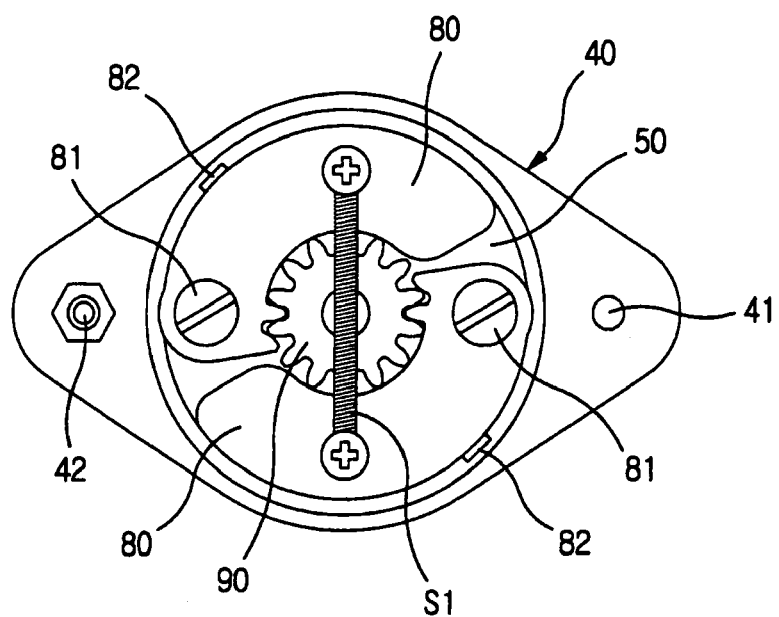
FIGS. 9a and 9b are views of operational statuses of the brake disk in accordance with the present invention
Figure 9B:
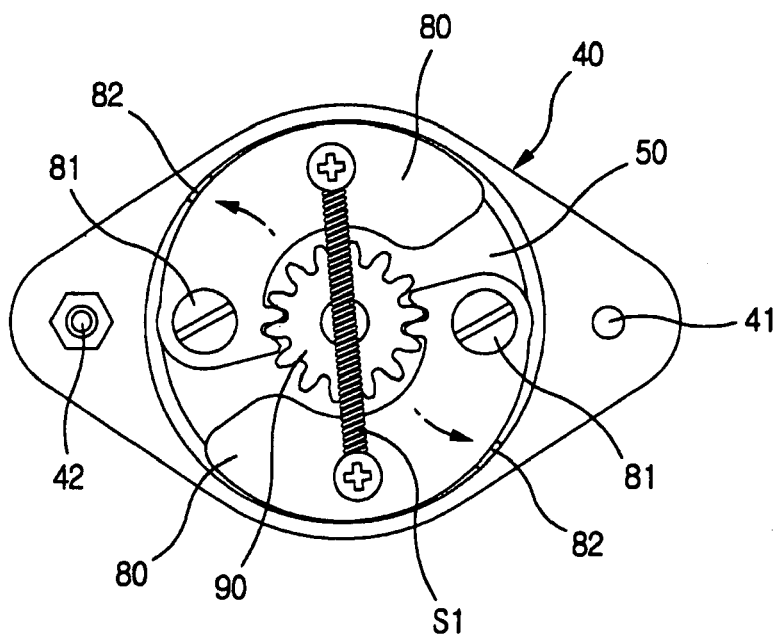

Therefore, when the walking support machine is moving slowly or at small acceleration on level ground, the brake pad (82) on the brake disk (80) maintains gap with the inner wall of the brake drum (40) by spring force, as shown in FIG. 9a, thus, no brake force is exerted. However, on a downward slope, if the pair of brake disks (80) rotates with large acceleration in high speed, the pair of brake disks (80) are extended outward by centrifugal force, as shown in FIG. 9b, with the bolt (81) as their axis, making the brake pad (82) to be pressed against the inner wall of the brake drum (40), and consequently, the brake apparatus is activated automatically.

According to a preferred embodiment of the present invention, as shown in FIGS. 7, 8, 9a and 9b, an idle gear (90) is installed between the pair of brake disk (80) and engaged. Here, on the inside of the brake disk (80) is formed with gear teeth which are engaged with those of the idle gear (90).

Said idle gear (90) is installed on the supporting shaft (52) of the $1^{st}$ gear (50) and rotates with the $1^{st}$ gear (50) as a single body. The idle gear (90) maintains the gap between the pair of brake disks (80) and brake drum (40) to be constant, and allows the pair of brake disk (80) to open outward by centrifugal force.

The functions and operation of the entire apparatus in accordance with the present invention are described herein below with reference to the drawings.

First, when the adjusting knob (70) is rotated to match neutral mark with the arrow mark on the fixed disk (10), as shown in FIG. 6a, the internal and $2^{nd}$ gears (50) (60) and high and low speed gears (20) (30) are separated, and in this state, the rear wheel (4) can rotate freely and idly around the shaft (13) of the fixed disk (10) forward and backward. Therefore, user can walk with the walking support machine forward or backward with the adjusting knob (70) set at neutral position. In this state, as shown in FIG. 6a, the engagement ball (72) is engaged with the engagement hole (72) at the center by spring force.

Next, when the adjusting knob (70) is rotated to match high speed mark with the arrow sign on the fixed disk (10), as shown in FIG. 6b, the guide rod (41) of the brake drum (40) is moved to high speed position, as shown in the figure, guided by the cam groove (71) on the rotating adjusting knob (70), and the engagement ball (72) is engaged with the left engagement hole (11) with a 'click' sound by spring force, as shown in FIG. 6b, and at the same time, the $1^{st}$ gear (50) on the shaft of the brake drum (40) maintains engagement with the high speed gear (20) as shown in FIG. 6b.

As shown in FIG. 6b, when the adjusting knob (70) is set at high speed, the $1^{st}$ gear (50) is engaged with the high speed gear (20) and the $2^{nd}$ gear (60) which is coupled with the unidirectional clutch (C) by a shaft which prevents backward rotation of the rear wheel (4). Therefore, in such high speed condition, the rear wheel (4) can rotate in forward direction only and not in backward direction.

When the adjusting knob (70) is set at high speed, if the user moves the walking support machine (W) forward, the front wheel (3) and rear wheels (4) rotate in forward direction, with both high speed gear (20) and low speed gear (30) of the rear wheel (4) rotate at the same time, and the $1^{st}$ gear (50) engaged with the high speed gear (20) rotates faster than the high speed gear (20) in opposite direction, making one pair of brake disk (80) connected with the $1^{st}$ gear (50) at increased, faster speed.

With the adjusting knob (70) in high speed setting, if the user moves the walking support machine slowly on level ground, as described herein above, the brake pad (82) of the brake disk (80) which is exerted with the force of spring (S1) maintains gap with the brake drum (40), as shown in FIG. 9a. Therefore, the brake mechanism is not activated under certain speed.

However, on a downward slope, with the adjusting knob (70) set at high speed position, under uncontrollable situation such as user's weight is loaded on the walking support machine (W) raising the speed of the rear wheels (4), the pair of brake disks (80) rotates with large acceleration in high speed, the pair of brake disks (80) are extended outward by centrifugal force, as shown in FIG. 9b, with the bolt (81) as their axis, making the brake pad (82) to be pressed against the inner wall of the brake drum (40), and consequently, the brake apparatus is activated automatically.

Next, when the adjusting knob (70) is rotated to match low speed mark with the arrow sign on the fixed disk (10), as shown in FIG. 6c, the guide rod (41) of the brake drum (40) is moved to low speed position, as shown in the figure, guided by the cam groove (71) on the rotating adjusting knob (70), and the engagement ball (72) is engaged with the right side engagement hole (11) with a 'click' sound by spring force, as shown in FIG. 6bc and at the same time, the $2^{nd}$ gear (60) engaged with the $1^{st}$ gear (50) maintains engagement with the low speed gear (30) as shown in FIG. 6c.

As shown in FIG. 6c, with the adjusting knob (70) set at low speed, the $2^{nd}$ gear (60), which is coupled with the unidirectional clutch (C), is engaged with the low speed gear (30), and is engaged with the $1^{st}$ gear (50), therefore, in this low speed setting, the rear wheels (4) can only rotate in forward direction, not in backward direction.

With the adjusting knob (70) set at low speed, if the user drives walking support machine forward, front wheel (3) and rear wheels (4) rotate in forward direction, and the high speed gear (20) and low speed gear (30) in the rear wheels (4) are driven. At this time, because the $2^{nd}$ gear (60) engaged with the low speed gear (30) rotates at higher speed that the low speed gear (30) in the same direction, therefore, the $1^{st}$ gear (50) engaged with the $2^{nd}$ gear (60) rotates in opposite direction, and the pair of brake disk (80) engaged with the $1^{st}$ gear (30) rotates at high speed.

In this state of adjusting knob (70) set at low speed, if the user moves the walking support machine at low speed, as described herein above, the brake pad (82) of the brake disk (80) which is exerted with the force of spring (S1) maintains gap with the brake drum (40), as shown in FIG. 9a. Therefore, the brake mechanism is not activated under certain speed.

However, on a downward slope with the adjusting knob (70) set at low speed, if the speed of rear wheels (4) is sharply increased due to any reason, the pair of brake disks (80) rotates with large acceleration in high speed, the pair of brake disks (80) are extended outward by centrifugal force, as shown in FIG. 9b, with the bolt (81) as their axis, making the brake pad (82) to be pressed against the inner wall of the brake drum (40), and consequently, the brake apparatus is activated automatically.

The reason that the automatic brake mechanism is designed to be activated at high and low speed separately by adjusting knob (70) setting is for the safety of users on downward slopes. For example, for users who have serious walking difficulties, it is appropriate that the brake is activated automatically at low speed when the user is walking down a downward slope at low speed, and for users who have little walking difficulty, it is appropriate that the brake is activated at high speed on downward slopes.

Therefore, according to the present invention, as described herein above, when rear wheels (4) are accelerated to faster than a certain speed level with adjusting knob (70) set at high or low speed, the pair of brake disks (80) are activated, as shown on FIG. 9b, by centrifugal force, to brake automatically, preventing accident on downward slopes.

In addition, according to the present invention, as described herein above, when the adjusting knob (70) is set at high or low speed, the unidirectional clutch (C) which allows rotation of the $2^{nd}$ gear (60) only in the forward direction of the rear wheels (4) prevents backward movement of the walking support machine (W), preventing accident on upward slopes.

In addition, according to the present invention, as described herein above, because the walking support machine (W) is automatically braked at a speed high than a certain level, speed of the machine is not increased even if the user exerts strong force, therefore, the user can experience exercising effect without danger by speed.

EFFECT OF THE INVENTION

As was described herein above, the automatic brake apparatus in accordance with the present invention is activated at a speed higher than a certain level. User safety on downward slopes can be protected from over-speed by the acceleration of gravity. In addition, since backward movement of walking support machine is prohibited when the adjusting knob is set at high and low speeds, safety of users on upward slopes can be protected. Furthermore, constant speed level can be maintained and users can have the advantage of exercising effect.

What is claimed is:

1. An automatic brake apparatus for a walking support machine having steering handles (1), main body (2), and front and rear wheels (3) (4), said apparatus comprising:

fixed disks (10) which are installed at the bottom of said main body and said rear wheels (4) to enable rotation;

high speed gears (20) and low speed gears (30) which are installed in the rear wheels concentrically;

brake drums (40) which are installed on the outside of the fixed disks (10);

1st gears (50) installed on a center shaft of said brake drums (40);

2nd gears (60) which are installed on one side of said brake drums (40) with unidirectional clutches (C) to prevent backward running and assembled with said 1st gear (50);

rotatable adjusting knobs (70) which are installed inside of said fixed disks (10), and assembles said 1st gears (50) and said 2nd gears (60) selectively with high speed gears (20) and low speed gears (30); and two pairs of brake disks (80) installed inside said brake drums (40) to receive tension spring (S1) and which rotate in connection with said 1st gears (50).

2. An automatic brake apparatus for a walking support machine in accordance with claim 1, wherein the automatic brake apparatus is formed with said fixed disks (10) formed with engagement holes (11) which are engaged for high, middle, and low speeds, long guide holes (12) which guide said brake drums (40), and said brake drums (40) are formed with guide rods (41) which are inserted into the long guide holes (12), and said adjusting knobs (70) are formed with cam grooves (71) which move said guide rods (41) to high, neutral, and low speed position and engagement balls (72) which are engaged with said engagement holes (11) selectively by a spring (S2) force.

3. An automatic brake apparatus for a walking support machine in accordance with claim 1, wherein the automatic brake apparatus is formed with idle gears (90) inserted and gear-engaged between said pair of brake disks (80).

* * * * *